United States Patent
Maeda et al.

(10) Patent No.: US 7,867,345 B2
(45) Date of Patent: Jan. 11, 2011

(54) MANUFACTURING METHOD OF THIN COMPONENT, BEARING RING, THRUST NEEDLE ROLLER BEARING, MANUFACTURING METHOD OF ROLLING BEARING RING, ROLLING BEARING RING, AND ROLLING BEARING

(75) Inventors: Kikuo Maeda, Kuwana (JP); Yuuki Kataoka, Kuwana (JP); Mitsuo Sasabe, Osaka (JP)

(73) Assignee: NTN Corporation, Osaka (JP)

( * ) Notice: Subject to any disclaimer, the term of this patent is extended or adjusted under 35 U.S.C. 154(b) by 248 days.

(21) Appl. No.: 10/574,779

(22) PCT Filed: Oct. 1, 2004

(86) PCT No.: PCT/JP2004/014501

§ 371 (c)(1), (2), (4) Date: Apr. 6, 2006

(87) PCT Pub. No.: WO2005/033346

PCT Pub. Date: Apr. 14, 2005

(65) Prior Publication Data

US 2008/0053578 A1 Mar. 6, 2008

(30) Foreign Application Priority Data

Oct. 6, 2003 (JP) ............... 2003-347095
Dec. 12, 2003 (JP) ............... 2003-414967

(51) Int. Cl.
*C21D 9/40* (2006.01)
(52) U.S. Cl. ...................................... 148/559
(58) Field of Classification Search ................. 148/559
See application file for complete search history.

(56) References Cited

U.S. PATENT DOCUMENTS

| 4,913,951 | A | * | 4/1990 | Pitolaj ..................... 428/76 |
| 6,093,268 | A | | 7/2000 | Hirakawa et al. |
| 6,149,860 | A | | 11/2000 | Furukawa et al. |
| 6,248,287 | B1 | | 6/2001 | Hirakawa et al. |

(Continued)

FOREIGN PATENT DOCUMENTS

DE   100 20 118 A1   10/2001

(Continued)

OTHER PUBLICATIONS

Machine translation document for Japan patent publication No. 09-296214.*

(Continued)

*Primary Examiner*—Roy King
*Assistant Examiner*—Jie Yang
(74) *Attorney, Agent, or Firm*—McDermott Will & Emery LLP (57) ABSTRACT

A manufacturing method of a thin component is characterized by heating a thin component, and thereafter, while sizing with molds and using molds as cooling media, performing one of quenching and isothermal transformation processes on thin component. Thus, a manufacturing method of a thin component without warping or deformation in heat treatment with even and high hardness, a bearing ring, a thrust needle roller bearing, a manufacturing method of a rolling bearing ring, a rolling bearing ring, and a rolling bearing can be obtained.

11 Claims, 2 Drawing Sheets

U.S. PATENT DOCUMENTS 6,682,227 B2   1/2004   Grell et al.

FOREIGN PATENT DOCUMENTS

| JP | 06-179920 | 6/1994 |
| JP | 07-216456 | 8/1995 |
| JP | 09-296214 | 11/1997 |
| JP | 09-302416 | 11/1997 |
| JP | 11-029821 | 2/1999 |
| JP | 2001-214213 | 8/2001 |
| JP | 2002-139067 | 5/2002 |
| JP | 2003-055713 | 2/2003 |
| JP | 2003-231915 | 8/2003 |
| WO | WO 96/06194 | 2/1996 |

OTHER PUBLICATIONS

Defination of terms "Quench" and "tempering" in Wikipedia, the on-line free encyclopedia.*

German Office Action, with English Translation, issued in corresponding German Patent application No. 11 2004 001 875.7-24, dated on Jul. 5, 2007.

* cited by examiner

MANUFACTURING METHOD OF THIN COMPONENT, BEARING RING, THRUST NEEDLE ROLLER BEARING, MANUFACTURING METHOD OF ROLLING BEARING RING, ROLLING BEARING RING, AND ROLLING BEARING

RELATED APPLICATION

This application is a national phase of PCT/JP2004/014501 filed on Oct. 1, 2004, which claims priority from Japanese Application No. 2003-347095 filed Oct. 6, 2003 and Japanese Application No. 2003-414967 filed on Dec. 12, 2003, the disclosures of which Applications are incorporated by reference herein. The benefit of the filing and priority dates of the International and Japanese Applications is respectfully requested.

TECHNICAL FIELD

The present invention relates to a manufacturing method of a thin component, a bearing ring, a thrust needle roller bearing, a manufacturing method of a rolling bearing ring, a rolling bearing ring, and a rolling bearing, and particularly, it relates to a manufacturing method of a thin component such as a ring of a thrust needle roller bearing and a thin bearing ring, which tend to show great deformation in heat treatment and which are not subjected to polishing after the heat treatment.

BACKGROUND ART

Conventionally, for a ring of a thrust needle (needle) roller bearing or a ring of a drawn cup radial needle roller bearing, a low-carbon SPCC (JIS: a cold rolled steel plate) product, an SCM415 product (JIS: a steel product of chromium molybdenum steel) and the like carburized for a short period of time and a hardness-requiring portion of the surface layer is hardened have been used. Also, products of mid-to high-carbon steel have been manufactured, such as an SK5 product (JIS: a steel product of carbon tool steel) subjected to through quenching by whole heating. With all of these, carburizing or a batch type furnace have been used in heat treatment.

On the other hand, in some applications quenching of a thin product by high-frequency heating has also been performed. Conventionally, as to quenching of a thin product or an uneven-thickness component by high-frequency heating, there are techniques that can be found in the following Patent Documents 1-4. All of these, however, employ air or gas for cooling in quenching so as to control the cooling rate for suppressing distortion, or to eliminate difference in quenching speed between a thick portion and a thin portion for suppressing deformation.

As to a tubular member, while there is a technique of providing constraint in quenching can be found (for example, Patent Document 5), it employs a solution in quenching. Hence, there has been no technique employing a mold for constraining and also as a quenching medium.

Patent Document 1: Japanese Patent Laying-Open No. 6-179920
Patent Document 2: Japanese Patent Laying-Open No. 9-302416
Patent Document 3: Japanese Patent Laying-Open No. 2001-214213
Patent Document 4: Japanese Patent Laying-Open No. 2003-55713
Patent Document 5: Japanese Patent Laying-Open No. 7-216456

DISCLOSURE OF THE INVENTION

Problems to be Solved by the Invention

With the conventional low-carbon SPCC or SCM415 product carburized for a short period of time and a hardness-requiring portion of the surface layer is hardened is excellent in material workability. However, as carburizing is employed in the heat treatment, the heat treatment is performed off-line, and there have been problems that the life or strength is not stabilized due to internal oxidation in carburizing or warping or deformation in quenching.

The mid-to high-carbon steel such as the SK5 product is involved with a problem that the material is high in hardness and that it is less workable. The products subjected to whole heating—quenching in an atmospheric furnace exhibit deformation due to uneven cooling, as can be seen in carburizing. Though slow and even cooling has been performed (for example, by blowing an inert gas for cooling) to such products subjected to through quenching, it is difficult to eliminate deformation, and tempering for correcting warping has been required to reduce warping.

As to the products subjected to high-frequency heating also, deformation in quenching cannot be avoided no matter how slowly the cooling is performed, so long as air or water is used as a quenching medium in the steps of high-frequency heating—water quenching. Particularly when water is used, liquid replacement has been necessary due to deterioration or consumption of the liquid.

Quenching by a mold can attain quenching without warping or deformation when associated with high-frequency heating. However, in a general technique, a mold is not used as a refrigerant, and cooling by oil or water, or drawing a product after oil quenching at a prescribed temperature and constraining by a mold is performed.

Accordingly, an object of the present invention is to provide a manufacturing method of a thin component without warping or deformation in heat treatment (in quenching) and with even and high hardness, a bearing ring, a thrust needle roller bearing, a manufacturing method of a rolling bearing ring, a rolling bearing ring, and a rolling bearing.

Means For Solving The Problems

A manufacturing method of a thin component according to the present invention is characterized by heating a thin component, and thereafter, while sizing (correcting) with molds and using the molds as cooling media of the thin component, performing one of quenching and isothermal transformation processes on the thin component.

Preferably, in the aforementioned manufacturing method of a thin component, the step of sizing the thin component with the molds includes the step of pressing the thin component with the molds.

Preferably, in the aforementioned manufacturing method of a thin component, the quenching of the thin component is performed using the molds as quenching media.

Preferably, in the aforementioned manufacturing method of a thin component, the mold has cooling means, and the thin component can be continuously quenched by the molds.

Preferably, in the aforementioned manufacturing method of a thin component, the thin component is quenched in an atmosphere in which oxidation of the thin component is prevented.

Preferably, in the aforementioned manufacturing method of a thin component, after the thin component is quenched, a tempering process is performed on the thin component using the molds as temperature controlling media.

Preferably, in the aforementioned manufacturing method of a thin component, the molds are used in both of the steps of quenching and tempering the thin component.

Preferably, in the aforementioned manufacturing method of a thin component, in the step of quenching the thin component, a molding process of the thin component using the molds is concurrently performed.

Preferably, in the aforementioned manufacturing method of a thin component, the heating of the thin component is performed by induction heating.

Preferably, in the aforementioned manufacturing method of a thin component, a material of the thin component is steel containing carbon by at least 0.4 mass %.

A bearing ring according to the present invention is manufactured by any of the aforementioned methods.

A thrust needle roller bearing according to the present invention uses the aforementioned bearing ring.

A manufacturing method of a rolling bearing ring according to the present invention is characterized by, after heating a rolling bearing ring as the thin component using the aforementioned manufacturing method of a thin component, by cooling the rolling bearing ring while pressing with the molds and using the molds as quenching media, quenching the rolling bearing ring.

Preferably, in the aforementioned manufacturing method of a rolling bearing ring, the heating of the rolling bearing ring is performed by induction heating.

Preferably, in the aforementioned manufacturing method of a rolling bearing ring, the rolling bearing ring is mid-carbon steel containing carbon by at least 0.4 mass %.

Preferably, in the aforementioned manufacturing method of a rolling bearing ring, in the quenching, a pressing pressure by the molds is at least 2.94 N/cm$^2$.

A rolling bearing ring according to the present invention is characterized in that it is manufactured by any of the aforementioned methods.

A rolling bearing according to the present invention includes the aforementioned rolling bearing ring and a rolling element.

Preferably, in the aforementioned rolling bearing, the rolling bearing is a thrust needle bearing.

Effects of the Invention

The inventors of the present invention found that, in a manufacturing method of thin component, by performing one of quenching and isothermal transformation processes on the thin component while pressing the thin component with molds and using the molds as cooling media of the thin component, a bearing ring that does not exhibit deformation or warping, that has an even hardness distribution, that is excellent in toughness, and that has long life can be manufactured.

As above, according to the manufacturing method of a thin component of the present invention, as warping and deformation are suppressed, a thin component can be manufactured with high precision. Further, as one of quenching and isothermal transformation processes is performed using molds as cooling media, a process that requires less time and that is even as compared to quenching by air-blow or oil can be attained. By maintaining the pressing pressure or temperature of the molds constantly, stable quality can be assured. Additionally, as no water or oil is used, working environment is clean and there will be no environmental pollution because of liquid waste or the like.

Still further, as the thin component is subjected to quenching or isothermal transformation process one by one, quality control is facilitated.

When quenching, by using steel of a composition that can easily be quench-hardened, not to mention S53C (JIS: steel product of steel for machine structural use) that is the representative mid-carbon steel, the aforementioned quality can be achieved even when slow quench-hardening is performed in the steps.

As to isothermal transformation, since transformation is caused by holding isothermally, the material of the thin component becomes a bainite structure. Thus, as compared to a martensite structure, there are advantages that less quenching distortion is resulted, toughness is attained without performing tempering, and secular dimensional change is suppressed. Further, as tempering is not necessary, a rolling bearing ring can be subjected to heat treatment peace by peace. Still further, as tempering is not necessary, normal quenching and tempering can be finished with one process, and thus production steps are reduced. Still further, by generating lower bainite, hardness can also be increased.

In the aforementioned manufacturing method of a thin component, as heating of the thin component is performed by induction heating, an inexpensive material for high-frequency use (steel for machine structural use) can be applied, and the life thereof is stable. Additionally, since heating is performed by induction heating, heating can be achieved in a short period of time, and a surface irregular layer such as with internal oxidation or decarburization will not be formed. Further, since heating is performed by induction heating, a non-quenching portion or non-isothermal transformation portion can partially be formed by changing quenching conditions or the shape of a coil, and therefore the method can also be applied to a product that requires a bending process after heat treatment.

In the aforementioned manufacturing method of a thin component, the thin component can attain enough hardness by being mid-carbon steel containing carbon by at least 0.4 mass %.

By using the aforementioned thin component, a bearing ring with stable life or strength and a thrust needle roller bearing using the same can be obtained.

The inventors of the subject invention found that, in a manufacturing method of a rolling bearing ring, by quenching the rolling bearing ring by cooling the rolling bearing ring while pressing with molds and using the molds as quenching media, a bearing ring can be manufactured, which has an even hardness distribution, does not have defects such as oxidation or decarburization on the surface layer face, has very few warping and deformation, and has a long life. In this case, by using steel of a composition that can easily be quench-hardened, not to mention S53C (JIS: steel product of steel for machine structural use) that is the representative mid-carbon steel, the aforementioned quality was achieved even when slow quench-hardening is performed in the steps.

As above, according to the manufacturing method of a rolling bearing ring of the present invention, since warping and deformation can be suppressed, a thin bearing ring can be manufactured with high precision. Additionally, as quenching is performed using molds as quenching media, quenching that requires less time and that is even as compared to quenching by air-blow or oil can be attained. By maintaining the pressing pressure or temperature of the molds constantly, stable quality can be assured. Additionally, as no water or oil is used, working environment is clean and there will be no environmental pollution because of liquid waste or the like.

Further, as quenching is performed for one by one, quality control is facilitated.

In the aforementioned manufacturing method of a rolling bearing ring, as heating of the rolling bearing ring is performed by induction heating, an inexpensive material for high-frequency use (steel for machine structural use) can be applied, and the life thereof is stable. Additionally, since heating is performed by induction heating, heating can be achieved in a short period of time, and a surface irregular layer such as with internal oxidation or decarburization will not be formed. Further, since heating is performed by induction heating, a non-quenching portion can partially be formed by changing quenching conditions or the shape of a coil, and therefore the method can also be applied to a process that requires a bending process after heat treatment.

In the aforementioned manufacturing method of a rolling bearing ring, the rolling bearing ring can attain enough hardness by being mid-carbon steel containing carbon by at least 0.4 mass %.

In the aforementioned manufacturing method of a rolling bearing ring, by setting the pressing pressure by the molds in quenching to at least 2.94 N/cm$^2$, warping and distortion can effectively be suppressed.

By using the aforementioned rolling bearing ring, a rolling bearing with stable life or strength, for example a thrust needle roller bearing can be obtained.

DESCRIPTION OF THE REFERENCE SIGNS 1 thin component (rolling bearing ring), 2 rolling element, 3 cage, 4 roller and cage assembly, 6, 7 collar portion, 10 rotary table, 10a heat insulator, 11 heating coil, 12a, 12b mold, 13 weight.

Best Modes For Carrying Out The Invention

In the following, embodiment of the present invention will be described based on the drawings.

Figure 1:
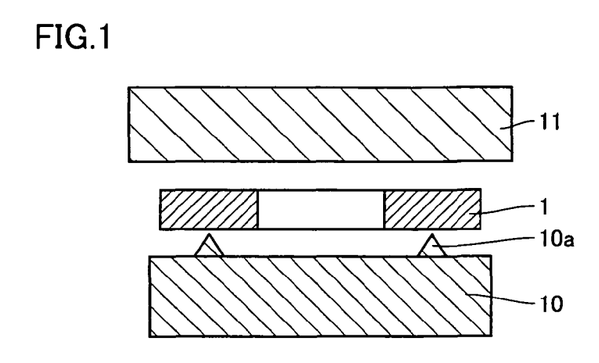
FIG. 1 is a schematic cross-sectional view showing a step of heating a rolling bearing ring in a manufacturing method of a thin component in one embodiment of the present invention.
Figure 2:
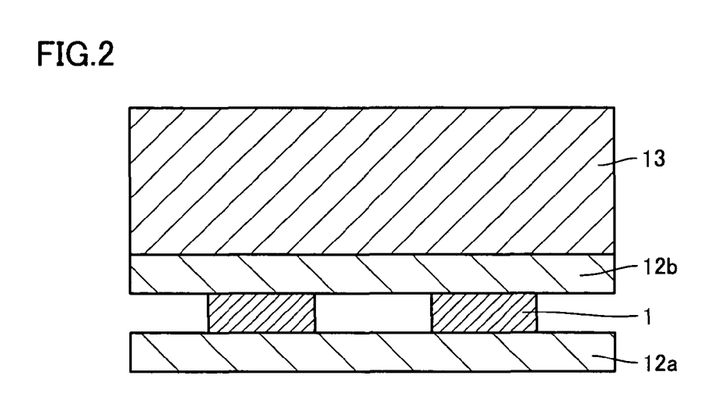
FIG. 2 is a schematic cross-sectional view showing a step of performing one of quenching and isothermal transformation processes on the rolling bearing ring in a manufacturing method of a thin component in one embodiment of the present invention.

FIGS. 1 and 2 are cross-sectional views showing step by step a manufacturing method of a thin component according to one embodiment of the present invention. First, as a material, steel having a prescribed composition, for example mid-carbon steel containing carbon by at least 0.4 mass % is prepared. This steel is subjected to a process of punching or cutting of a plate-shape product or the like, to have a shape of a rolling bearing ring as one example of a thin component. It should be noted that, in the present embodiment, a thin component specifically refers to a component of at most 3 mm thickness.

Referring to FIG. 1, a bearing ring 1 is placed on a heat insulator 10a of a rotary table 10, and induction-heated by a heating coil 11, for example. Here, bearing ring 1 is rotated by rotary table 10.

Referring to FIG. 2, bearing ring 1 heated to a prescribed temperature is interposed between molds 12a and 12b, and a weight 13 is placed on mold 12b. Thus, bearing ring 1 is subjected to quenching process or isothermal transformation process, while being pressed (sized) by molds 12a, 12b with a pressing pressure of at least 2.94N/cm$^2$ (0.3 kgf/cm$^2$), for example, and using molds 12a, 12b as cooling media. In other words, molds 12a, 12b constrain bearing ring 1 and serve as quenching media in quenching bearing ring 1, or as isothermal transformation media in isothermal transformation.

After quenching bearing ring 1, bearing ring 1 may be tempered in the state constrained by molds 12a, 12b. In this case, molds 12a, 12b serve as tempering media in tempering bearing ring 1.

Through the aforementioned method, bearing ring 1 can be manufactured, which has an even hardness distribution, does not have defects such as oxidation or decarburization on the surface layer face, has very few warping and deformation, and has a long life.

As compared to a conventional bearing ring manufactured using air or gas as a quenching medium, rolling bearing ring 1 manufactured as above has low and aligned flatness, and also has stabilized hardness.

It should be noted that, when quenching bearing ring 1, there is a method to substantially increase the heat capacity of molds 12a, 12b as compared to that of bearing ring 1, as molds 12a, 12b are used as quenching media. For example, in order to suppress the temperature increase of molds 12a, 12b by at most 5 C.° for lowering the temperature of bearing ring 1 by 900 ° C., the heat capacity of molds 12a, 12b must be at least 180 times as great as that of bearing ring 1. As bearing ring 1 is interposed between upper and lower molds 12a, 12b, the heat capacity of either upper mold 12a or lower mold 12b must be at least 90 times as great as that of bearing ring 1. Accordingly, provided that bearing ring 1 and molds 12a, 12b are formed of the same material (for example, steel) and have the same specific heat, then the mass of either upper mold 12a or lower mold 12b must be at least 90 times as great as that of bearing ring 1. If a substance of great heat capacity, for example water, is allowed to flow through the molds, the molds themselves may be small.

If heating/quenching is performed in the air, even for a short period of time, a thin component may be oxidized. Thus, an oxide film may be formed, the surface hardness may be decreased due to decarburization, or precipitation of troostite may occur. A product such as a ring of a thrust needle roller bearing, which is not subjected to finishing (polishing, super finishing) by a machine process after heat treatment, requires heat treatment (quenching) for suppressing oxidation/decarburization. Such heat treatment can be addressed by using an inert gas in the atmosphere.

As quenching or isothermal transformation, in which molds are employed as cooling media as in the present embodiment, is a heat treatment of piece-by-piece, it is not necessary to separate the heat treatment process from a production line as in a conventional manner, but instead it may be incorporated into the production line of a machine process. Further, if tempering is performed by high-frequency induction heating or high-frequency heating while performing pressing with molds (high-frequency press-tempering), there is an advantage of integrating the whole processes from material input to product completion into a line.

In light of improving a processing speed, an efficient continuous quenching is possible by performing quenching while constantly cooling inside of the molds or the pressing surface with water, oil, air or the like. To this end, it is preferable to provide cooling means for introducing medium such as water, oil, air or the like into the molds.

It should be noted that, while tests were conducted in examples described below with plate-like products of 1 mm thickness, the method of the present invention is applicable to a thick plate (a 5-6 mm thickness plate) if the pressure when pressing is increased, though the thickness for quench-hardening at the cooling rate by the molds may be limited.

The molding process of a flange or a collar can simultaneously be performed when quenching, by controlling the shape of the mold or the pressing pressure.

Figure 3:
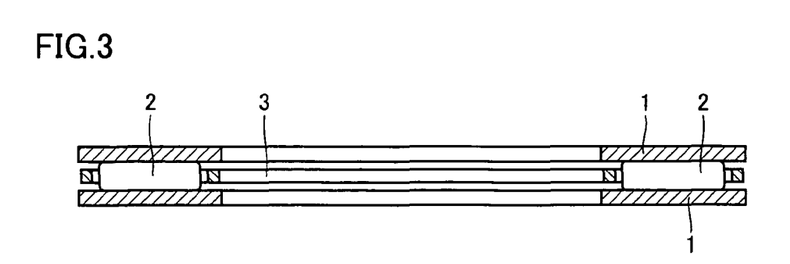
FIG. 3 is a schematic cross-sectional view showing a structure of a thrust needle roller bearing using a rolling bearing ring in one embodiment of the present invention.

Using bearing ring 1 manufactured by the aforementioned method, a thrust needle roller bearing, for example as shown in FIG. 3, can be manufactured. This thrust needle roller bearing has a pair of bearing rings 1, and a plurality of rolling elements 2 (needle rollers) arranged between the pair of bearing rings 1, and a cage 3 for rollably holding the plurality of rolling elements 2.

Figure 4:
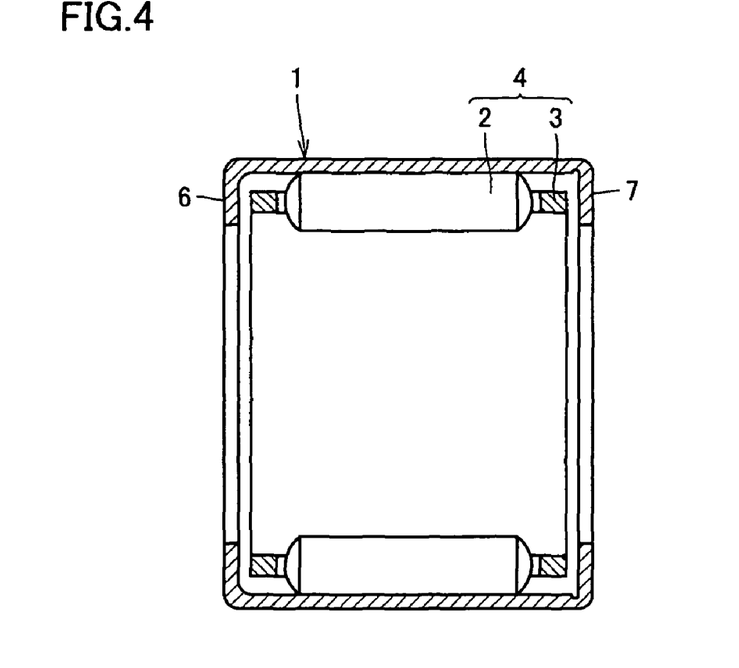
FIG. 4 is a schematic cross-sectional view showing a structure of a drawn cup radial needle roller bearing using a rolling bearing ring in one embodiment of the present invention.

Additionally, using bearing ring 1 manufactured by the aforementioned method, a drawn cup radial needle roller bearing, for example as shown in FIG. 4, can also be manufactured. This drawn cup radial needle roller bearing has a cylindrical outer ring 1 that is bearing ring 1, and a roller and cage assembly 4 arranged on the internal periphery side of outer ring 1. Roller and cage assembly 4 has a plurality of rolling elements (needle rollers) 2, and a cage 3 for rollably holding the plurality of rolling elements 2. While collar portions 6, 7 are arranged on the opposing ends of outer ring 1, one of or both of collar portions 6, 7 may be eliminated. Additionally, as shown in FIG. 5, a plurality of (or two) roller and cage assemblies 4 may be arranged on the internal periphery side of outer ring 1, as shown in FIG. 5.

Figure 5:
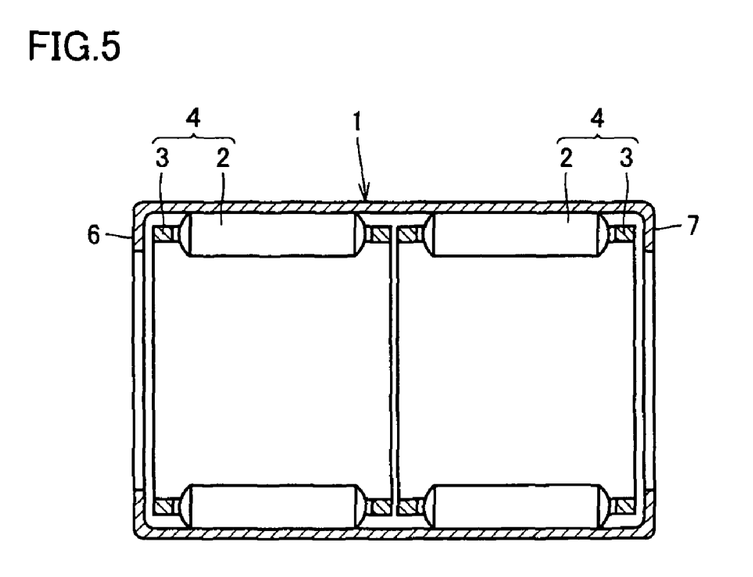
FIG. 5 is a schematic cross-sectional view showing a structure of a drawn cup radial needle roller bearing in which a plurality of roller and cage assemblies are arranged in an outer ring.

As bearing ring 1 shown in FIG. 4 or 5 is cylindrical outer ring 1, cooling molds used in quenching outer ring 1 must be in a shape different from that of molds 12a, 12b shown in FIG. 2, i.e., for example a cylindrical shape.

While the case in which a thin component is a bearing ring of a thrust needle roller bearing has been described in the foregoing, the present invention is not limited thereto and it may be a washer or a leaf spring that is employed in a wearing portion.

EXAMPLE

In the following, examples of the present invention will be described.

Example 1

Mid-carbon steel S53C was used as a material, and a thrust needle roller bearing ring (NTN product name: AS1112) having an outer shape of inner diameter 60 mm, outer diameter 85 mm, and thickness 1 mm was manufactured by punching from a plate-like product.

Using a high-frequency induction heating apparatus (80 kHz) and rotating the ring, induction heating was performed by allowing prescribed current to flow through an induction coil arranged closely to one end panel (FIG. 1). In this case, heating was conducted slowly in order for the entire ring to attain a uniform temperature (approximately 900° C.). Thereafter, the ring was set in upper and lower press molds made of iron and having a heat capacity substantially greater than that of the ring, the ring was immediately pressed by pressing at a prescribed pressure and transformation-hardened through mold cooling by pressing (FIG. 2). Varying mold temperature at transformation-hardening and constraint time by the molds, the relationship between hardness and microstructure was examined.

Table 1 shows relationship among mold temperature and constraint time (holding time) by molds, pressing pressure, warping deformation, hardness after heat treatment, and microstructure.

Table 1 also shows relationship among warping deformation, hardness after heat treatment, and microstructure of a sample that was high-frequency heated and thereafter water quenched, a sample that was wholly heated and thereafter air-blow quenched, and a sample that was high-frequency heated and air-cooled.

TABLE 1

| | | Quality of Samples After Heat Treatment | | | | | |
|---|---|---|---|---|---|---|---|
| | | Press Cooling or Quenching | | Pressing | Warping | | |
| | Steel Type | Mold Temperature | Holding Time | Pressure (N/cm²) | Deformation (μm) | Hardness (HV) | Structure |
| Example of Present Invention | S53C | 250 | 1 min | 2.94 | 16 | 745 | TM + LB |
| | | 300 | 1 min | 2.94 | 18 | 730 | TM + LB |
| | | 320 | 1 min | 2.94 | 18 | 685 | LB |
| | | 300 | 5 min | 2.94 | 18 | 710 | LB |
| | | 300 | 30 sec | 2.94 | 19 | 730 | TM + LB |
| | | 30 | 1 min | 2.94 | 20 | 750 | M |
| Comparative Example | S53C | High-Frequency Heated, Thereafter Water Quenched | | Without Pressing | >250 | 740 | M |
| | | Wholly Heated, Thereafter Air-Blow Quenched | | Without Pressing | 48 | 710 | M |

TABLE 1-continued

| | | Quality of Samples After Heat Treatment | | | | |
|---|---|---|---|---|---|---|
| | Press Cooling or Quenching | | Pressing | Warping | | |
| Steel Type | Mold Temperature | Holding Time | Pressure (N/cm$^2$) | Deformation (μm) | Hardness (HV) | Structure |
| | High-Frequency Heated, Thereafter Air-Cooled | | Without Pressing | 29 | 510 | T |

Structure:
TM refers to tempered martensite,
LB refers to lower bainite,
M refers to quenched martensite,
T refers to troostite From the result shown in Table 1, it can be seen that, as in the example of the present invention, with the pressing pressure of 2.94N/cm$^2$ (0.3 kgf/cm$^2$), by setting the mold temperature to at least 250° C. and at most 320° C. and the constraint time (holding time) by molds to at least 30 seconds and at most 5 minutes, isothermal transformation occurs and a structure having lower bainite can be obtained. It can also be seen that, in the structure of the example of the present invention having lower bainite, warping deformation becomes at most 19 μm, and Vickers hardness HV becomes at least 685. Further, in part of the example of the present invention, a structure similar to tempered martensite that appears on tempering was observed, while tempering was not performed.

Additionally, it can be seen that, as in the example of the present invention, when continuous cooling was performed by setting the mold temperature to 30° C. and the constraint time (holding time) by molds to 1 minute, martensite transformation occurs and a structure having tempered martensite can be obtained. It can also be seen that, in this sample, warping deformation becomes 20 μm, and Vickers hardness HV becomes 750.

As above, it has been shown that, with all samples of the present invention, warping deformation becomes at most 20 μm, and Vickers hardness HV becomes at least 685.

On the other hand, samples of the comparative example were in a quality in which warping deformation was more than 20 μm and which cannot attain Vickers hardness of at least HV 685.

As to the representative of these bearing rings, result of performing life estimation with the condition shown in Table 2 is shown in Table 3.

TABLE 2

| Thrust Bearing Life Test Condition | |
|---|---|
| Bearing Ring | NTN Product Name AS1112 (φ60 × φ85 × t1) |
| Cage, Roller | Half (twenty-four) of Rollers of NTN Product Name AXK1112 |
| Number of Revolutions | 5000 rpm |
| Bearing Load | 9.8 kN |
| Lubricating Oil | VG10 |
| Oil Film Parameter | 0.101 |
| Calculated Life | 11.3 h (Considering Oil Film Parameter) |
| Number of Test Specimens | 6 pieces |

TABLE 3

| | | | Life Test Result of Samples | | | |
|---|---|---|---|---|---|---|
| | | | Press Cooling or Quenching | | Life Test Result | |
| | Steel Type | Heat Treatment | Mold Temperature | Holding Time | L10(h) | L10 ratio |
| Example of Present Invention | S53C | High-Frequency Heating | 250 | 1 min | 19.3 | 1.2 |
| | | | 300 | 1 min | 16.5 | 1.0 |
| | | | 320 | 1 min | 15.2 | 1.0 |
| | | | 300 | 5 min | 16.9 | 1.1 |
| | | | 300 | 30 sec | 17.2 | 1.1 |
| | | | 30 | 1 min | 15.8 | 1.0 |
| Comparative Example | S53C | High-Frequency Heated, Thereafter Water Quenched | | Without Pressing | Test Impossible Due to Great Deformation | |
| | | Wholly Heated, Thereafter Air-Blow Quenched | | Without Pressing | L10 = 11.9 h | |
| | | High-Frequency Heated, Thereafter Air-Cooled | | Without Pressing | Test Impossible Due to Low Hardness | |

Here, since the ring of the example of the present invention subjected to isothermal transformation is partially or wholly subjected to isothermal transformation, tempering was not performed.

The rings of the example of the present invention subjected to martensite transformation by continuous cooling quenching were subjected to tempering of 150° C.×120 minutes. The test was conducted under a scarce lubrication condition.

From the result of Table 3, it can be seen that L10 life of the samples of the example of the present invention was at least 15.2 hours, which was increased. The sample of the comparative example, which was high-frequency heated normally and thereafter water quenched, was so deformed that it could not be tested. The sample of the comparative example, which was wholly heated and thereafter air-blow quenched, exhibited 11.9 hours of L10 life, which was reduced. Despite being a thin component, the sample of the comparative example, which was high-frequency heated and thereafter air-cooled, was not quench-hardened.

From the result above, with the ring obtained by the present method (the example of the present invention), warping deformation can be suppressed, and hardness and life can be increased as compared to the comparative example.

Example 2

As materials, mid-carbon steel S53C and steel of a composition that is improved in quenching property and that can attain sufficient hardness with slow cooling (0.7 mass % C-1.0 mass % Si-0.6 mass % Mn-1.5 mass % Cr-0.3 mass % Mo) were used.

From these materials, thrusts needle bearing ring (NTN product name: AS1112) having an outer shape of inner diameter 60 mm, outer diameter 85 mm, and thickness 1 mm was manufactured by cutting.

Using a high-frequency induction heating apparatus (80 kHz) and rotating the ring, induction heating was performed by allowing prescribed current to flow through an induction coil arranged closely to one end panel (FIG. 1). In this case, heating was conducted slowly in order for the entire ring to attain a uniform temperature (approximately 900° C.). Thereafter, the ring was set in upper and lower press molds made of iron and having a heat capacity substantially greater than that of the ring, the ring was immediately pressed by pressing at a prescribed pressure and quench-hardened through mold cooling by pressing (FIG. 2). In this case, by setting the pressing-pressure to at least approximately 2.94N/cm$^2$, deformation/warping in quenching-hardening was prevented. The time required for quench-hardening (the cooling time until normal temperature was attained) was approximately two second. The mass of one of upper and lower press molds used this time was 3.4 kg at the lightest. As the mass of the ring was 22 g, the heat capacity of one of the press molds was approximately 150 times as great as that of the ring.

Table 4 shows deformation state of conventional various products and deformation state in the experiment conducted this time.

TABLE 4

| | Steel Type | Heat Treatment | Quenching | Pressing Pressure (N/cm$^2$) | Warping Distortion (μm) | Hardness (HV) |
|---|---|---|---|---|---|---|
| Example of Present Invention | S53C | High-Frequency Heating | Press-Quenching | 0.98 | 47 | 730 |
| | | High-Frequency Heating | Press-Quenching | 2.94 | 20 | 760 |
| | | High-Frequency Heating | Press-Quenching | 9.80 | 19 | 770 |
| | 0.7% C Steel | High-Frequency Heating | Press-Quenching | 0.98 | 75 | 750 |
| | | High-Frequency Heating | Press-Quenching | 2.94 | 52 | 780 |
| | | High-Frequency Heating | Press-Quenching | 9.80 | 48 | 775 |
| Comparative Example | S53C | High-Frequency Heating | Water Quenching | Without Pressing | 690 | 740 |
| | SCr 415 | Carburizing | Oil Quenching | | 830 | 730 |
| | SPCC | Carburizing | Oil Quenching | | 715 | 730 |
| | SK5 | Whole Heating | Oil Quenching | | 650 | 760 |
| | SCr 415 | Carburizing | Air-Blow Quenching | | 99 | 730 |
| | SK5 | Whole Heating | Air-Blow Quenching | | 78 | 750 |

Quality of Samples After Heat Treatment

From the result of Table 4, while conventional air-blow quenching products show few warping, deformation or warping of the products according to the present method still show smaller degree than the air-blow quenching products, irrespective of the steel types. Accordingly, distortion correction or warping correction after heat treatment is not necessary. By setting pressing-pressure to at least a prescribed value, deformation was suppressed to at most a certain value. It should be noted that, as actual quenching is not quenching using water soluble cooling agent or oil, the periphery of the quenching mechanism can be maintained clean, eliminating waste liquid processes.

After performing the aforementioned quenching to the test rings, tempering at 150° C. for two hours was performed, and finishing process was performed on the surface thereof. Thus, the rings were subjected to life estimation. The test was conducted under a scarce lubrication condition. The rolling life test condition was the same as the condition shown in Table 2. The test result is shown in Table 5.

TABLE 5

Life Test Result of Samples

| | Steel Type | Heat Treatment | Quenching | Pressing Pressure ($N/cm^2$) | L10 life (h: hour) | Life Ratio |
|---|---|---|---|---|---|---|
| Example of Present Invention | S53C | High-Frequency Heating | Press-Quenching | 2.94 | 15.8 | 1.0 |
| | | High-Frequency Heating | Press-Quenching | 9.80 | 17.7 | 1.1 |
| | 0.7% C Steel | High-Frequency Heating | Press-Quenching | 2.94 | 25.6 | 1.6 |
| | | High-Frequency Heating | Press-Quenching | 9.80 | 27.9 | 1.8 |
| Comparative Example | S53C | High-Frequency Heating | Water Quenching | Without Pressing | Test Impossible Due to Great Warping | |
| | SCr 415 | Carburizing | Oil Quenching | | | |
| | SPCC | Carburizing | Oil Quenching | | | |
| | SK5 | Whole Heating | Oil Quenching | | | |
| | SCr 415 | Carburizing | Air-Blow Quenching | Without Pressing | 15.9 | 1.0 |
| | SK5 | Whole Heating | Air-Blow Quenching | | 13.8 | 0.9 |

From the result of Table 5, in the rings according to the present method that provides less warping deformation, even S53C attained the life of the conventional carburized product level. 0.7 mass % C steel attained longer life than the carburized steel. This may be attributed to its higher content of C as compared to S53C, which facilitates attaining high hardness. Additionally, it is considered that much Si, Mo, and Cr content contributed to the long life. The thin races in the shape of the present case exhibited great warping deformation with free quenching by oil or water, and therefore life test could not be conducted.

From the result above, with the rings (example of the present invention) obtained through the present method, warping deformation was suppressed as compared to the comparative example, and the life thereof can be increased.

It should be understood that the embodiment and examples disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The manufacturing method of the present invention is advantageously applied to a manufacturing method of a thin component, such as a ring of a thrust needle roller bearing or a thin bearing ring, which tends to show great deformation in heat treatment and to which a polishing process after the heat treatment is not performed.

The invention claimed is:
1. A manufacturing method of a thin component, including the steps of
heating a thin component, and thereafter, while sizing with molds and using said molds as cooling media of said thin component, performing a quenching process on said thin component, wherein
after said thin component is quenched, said thin component is tempered using said molds as temperature controlling media,
said quenching process causes a martensitic transformation,
a material of the thin component is steel containing carbon by at least 0.4 mass %,
the thin component is a bearing ring of a thrust needle roller bearing,
in said quenching, a pressing pressure by said molds is at least 2.94 $N/cm^2$,
the molds include an upper mold and a lower mold, and
a heat capacity of one of the upper mold and the lower mold is at least 90 times as great as that of the thin component.
2. The manufacturing method of a thin component according to claim 1, wherein
said step of sizing said thin component with said molds includes the step of pressing said thin component with said molds.

3. The manufacturing method of a thin component according to claim 1, wherein
said quenching of said thin component is performed using said molds as quenching media.

4. The manufacturing method of a thin component according to claim 1, wherein
said molds have cooling means, and said thin component can continuously be quenched by said molds.

5. The manufacturing method of a thin component according to claim 1, wherein
said thin component is quenched in an atmosphere in which oxidation of said thin component is prevented.

6. The manufacturing method of a thin component according to claim 1, wherein
said molds are used in both of said steps of quenching and tempering said thin component.

7. The manufacturing method of a thin component according to claim 1, wherein
in said step of quenching said thin component, a molding process of said thin component using said molds is concurrently performed.

8. The manufacturing method of a thin component according to claim 1, wherein said heating of said thin component is performed by induction heating.

9. A manufacturing method of a rolling bearing ring, comprising the step of,
after heating a rolling bearing ring as said thin component using the manufacturing method of a thin component according to claim 1, by cooling said rolling bearing ring while pressing with said molds and using said molds as quenching media, quenching said rolling bearing ring.

10. The manufacturing method of a rolling bearing ring according to claim 9, wherein
said heating of said rolling bearing ring is performed by induction heating.

11. The manufacturing method of a rolling bearing ring according to claim 9, wherein
said rolling bearing ring is mid-carbon steel containing carbon by at least 0.4 mass %.

\* \* \* \* \*